United States Patent [19]

Rysewyk

[11] Patent Number: 4,532,953

[45] Date of Patent: Aug. 6, 1985

[54] APPARATUS FOR TAPPING AND DRAINING BATTERIES

[75] Inventor: Ambrose L. Rysewyk, Elgin, Ill.

[73] Assignee: AT&T Technologies, Inc., New York, N.Y.

[21] Appl. No.: 512,859

[22] Filed: Jul. 11, 1983

[51] Int. Cl.³ .............................................. F17C 13/04
[52] U.S. Cl. .................................... 137/255; 137/266; 137/318; 429/49; 429/95
[58] Field of Search .................... 429/95, 49; 137/317, 137/255, 256, 259, 318, 315, 266, 802, 124; 239/271, 272; 222/80, 81, 82, 83; 141/65

[56] References Cited

U.S. PATENT DOCUMENTS

| | | | |
|---|---|---|---|
| 997,464 | 7/1911 | Metcalf | 137/318 |
| 1,027,341 | 5/1912 | Jurkovich | 269/243 |
| 1,823,448 | 9/1931 | Hebbeler | 429/95 |
| 2,608,989 | 8/1956 | McDonald | 137/318 |
| 2,617,559 | 11/1952 | Van der Spek | 222/83 |
| 3,045,511 | 7/1962 | Risley | 137/318 |
| 4,411,459 | 10/1983 | Ver Nooy | 137/318 |

Primary Examiner—Martin P. Schwadron
Assistant Examiner—John S. Starsiak, Jr.
Attorney, Agent, or Firm—R. P. Miller; M. de Picciotto

[57] ABSTRACT

A pair of vacuum chambers (27 and 28) are mounted on a T-bar gripper (19) which engages the back walls of a pair of adjacent batteries (16). Operation of a knurled, internally threaded collar (23) draws the vacuum chambers into sealed (54) engagement with the battery casings. A pair of drills (66) mounted at acute angles greater than 45° are operated to drill angular holes (71) through the casings into the vicinity of the bottoms of the casings. Application of vacuum to the chambers draws electrolyte from the casings to levels below the levels of the entries of the angular holes into the casings.

9 Claims, 10 Drawing Figures

APPARATUS FOR TAPPING AND DRAINING BATTERIES

FIELD OF THE INVENTION

This invention relates to an apparatus for tapping a hole in a liquid electrolytic battery and for draining the electrolyte from the battery, and more particularly, to a quick connect battery tapping and draining apparatus, wherein electrolyte may be drained from the battery with a minimum, if any, of spillage.

BACKGROUND OF THE INVENTION

Banks of large liquid electrolytic batteries are used extensively in telephone switching offices, microwave relay stations, and in large computer installations as a primary or backup source of power. After a period of time, these batteries deteriorate and must be replaced. Replacement is usually accomplished by first drilling a horizontal hole near the bottom of a side wall of each battery and then vacuum draining the electrolyte, whereafter, the battery is removed from the bank and replaced with a new battery.

Several different types of drill devices encased within vacuum chambers have been devised for horizontally tapping battery casings and draining the electrolyte from the interior of the battery into suitable tanks for subsequent disposal or reclamation. These tapping and drilling devices may be abutted and sealed against the battery casing wall by throwing a strap around the battery casing and drawing up the strap to forcibly hold the device in place. In other instances, the vacuum chamber and drill apparatuses are held against the battery wall by suction cup devices.

The use of these battery drill and drain apparatuses often require considerable time and effort in setting in place and often encounter problems in maintaining an effective seal between the drain apparatus and the battery casing, thus resulting in frequent leakage of electrolyte during the draining operation. Further, use of these devices, even when the tap hole is placed near the bottom of the battery, leaves a significant amount of electrolyte in the battery which is subsequently spilled during removal of the battery from the installation site.

SUMMARY OF THE INVENTION

This invention contemplates, among other things, a battery tap and drain apparatus which is easily attached and sealed to a pair of battery casings and is operated to drill acute angular holes in one or both of a pair of battery casings, wherafter, nearly all of the electrolyte may be drained without any significant spillage.

More particularly, the apparatus features a pair of vacuum chambers secured to a clamping device which is placed and secured between a pair of spaced adjacent batteries. The clamping device includes draw-up facilities which act to force and seal the vacuum chambers against the lower corners of adjacent batteries. Drill bits extend through the vacuum chambers at acute angles greater than 45° and are operated to drill acute angular holes extending downwardly through the outer walls of the battery casings into proximity with the bottoms of the casings.

Subsequent application of vacuum to the chambers acts to drain nearly all of the electrolyte from the battery casings. The remaining electrolyte, a minute amount, in each battery is at a level of the top of the acute angular hole exiting into the inside of the casing wall which is below the level of the bottom of the entry of the hole in the outside casing wall. When the drained batteries are removed from the installation site, slight amounts of tilting of the battery casings, which is normally encountered, will not result in the spillage of electrolyte.

BRIEF DESCRIPTION OF THE DRAWINGS

Other advantages and features of the invention will be apparent upon consideration of the following desription when considered in conjunction with the drawing wherein.

DETAILED DESCRIPTION

Figure 1:
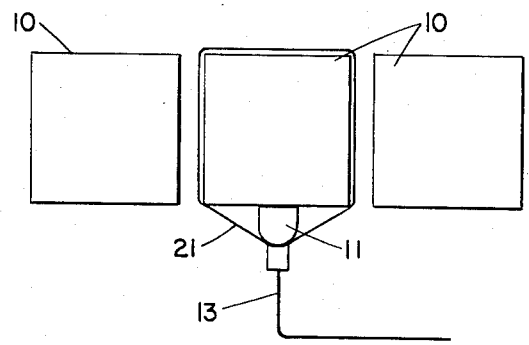
FIG. 1 is a top schematic view of a bank of liquid filled batteries together with a prior art arrangement of a battery tap and drain apparatus held in place by a strap drawn around one battery.

Referring to FIG. 1, there is shown a plan view of a series of large batteries 10 of the type used in telephone exchanges and other installations as backup or primary power supplies. When a battery deteriorates and needs replacement, it is necessary to drain the electrolyte from the batteries. Each battery may weight up to 1700 pounds and contains 30 to 50 gallons of electrolyte, usually sulphuric acid.

In the past, the electrolyte was removed by attaching a tap and drain apparatus 11 to the battery. The apparatus is temporarily attached to the battery by placing a steel strap 12 about the girth of the battery and then tightening the strap to secure and seal the apparatus to a lower portion of the battery. Prior art apparatuses of this type include a drill which functions to form a horizontal tap hole in a lower section of the front wall of the battery casing. A vacuum line 13 is connected to the device to drain electrolyte through the line to a tank or other receiving vessel. The attaching and draining operations are time consuming and often result in a spillage of a considerable amount of electrolyte.

Figure 2:
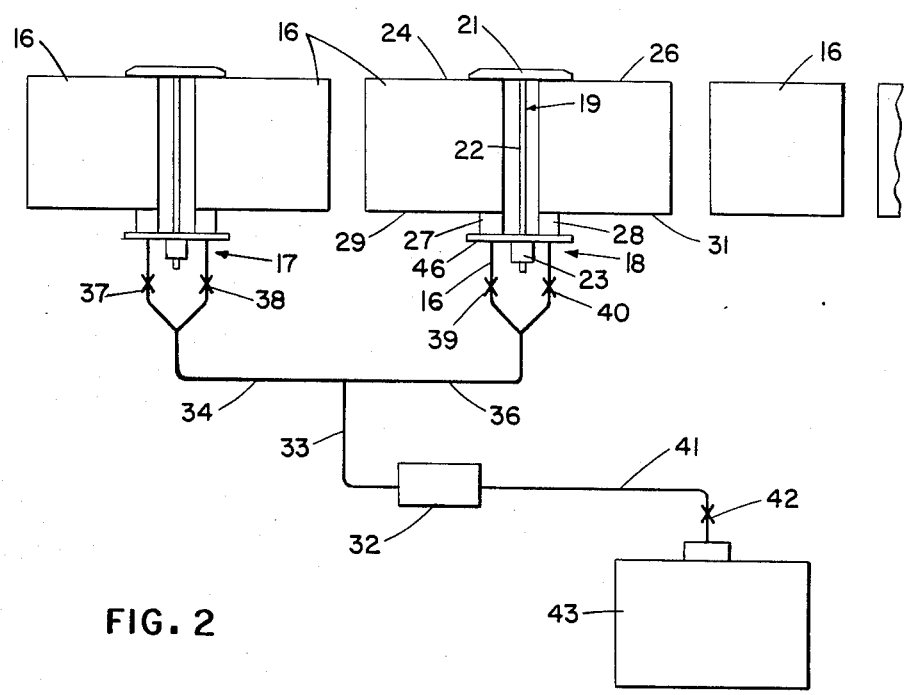
FIG. 2 is a top schematic view of a bank of liquid filled electrolytic batteries together with a showing of a pair of tap and drain apparatuses of the present invention secured to two pairs of batteries.
Figure 3:
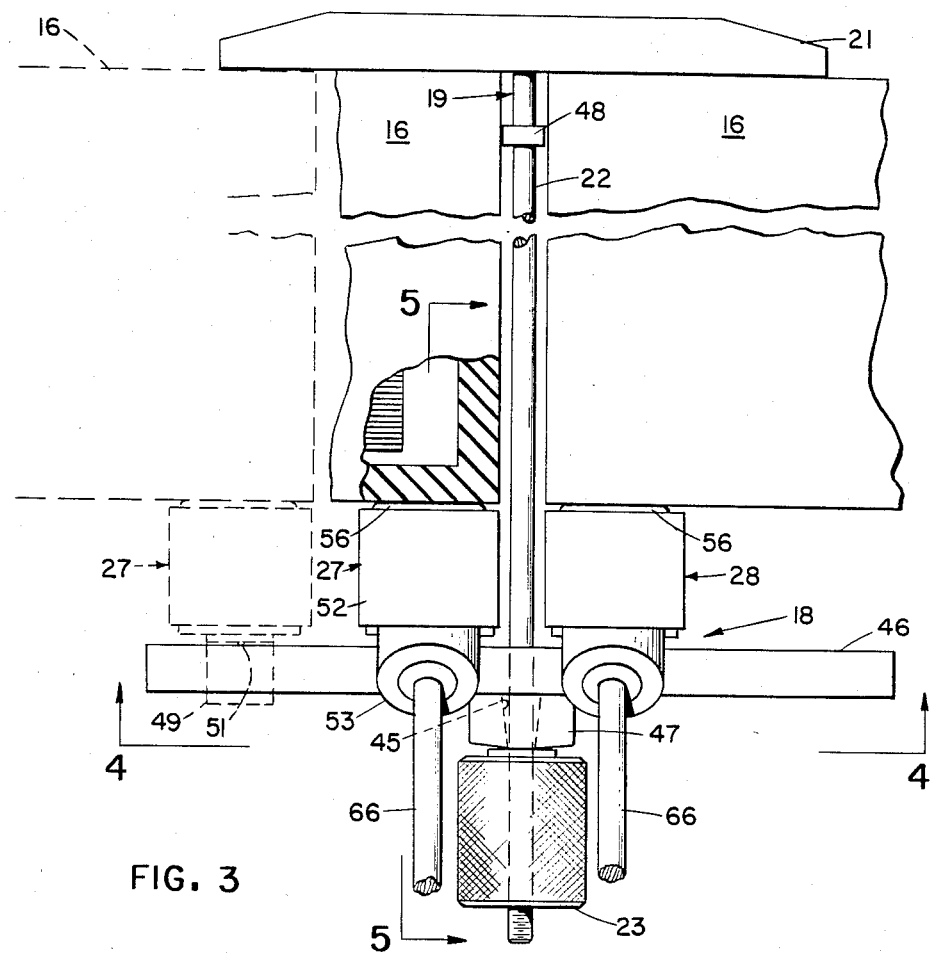
FIG. 3 is a top view, partially cut away, of one tap and drain apparatus of the invention and a clamping arrangement for securing the apparatus to a pair of adjacent batteries.
Figure 4:
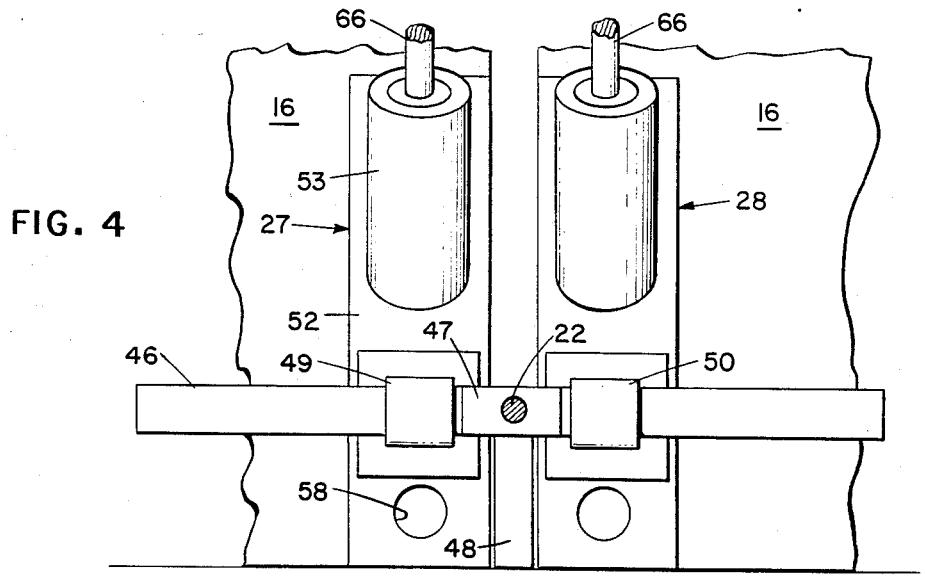
FIG. 4 is a front elevational view of the tap and drain apparatus as viewed in the direction of the arrows 4—4 depicted in FIG. 3.
Figure 5:
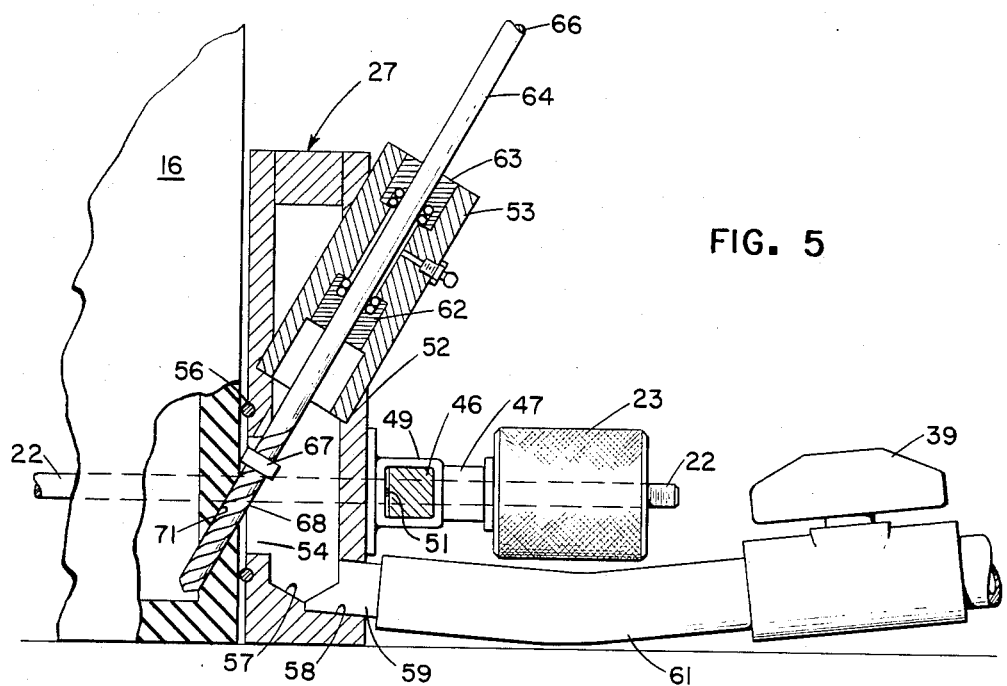
FIG. 5 is a sectional view taken along line 5—5 of FIG. 3 showing a drill for boring an acute angular hole in the battery casing wall.
Figure 6:
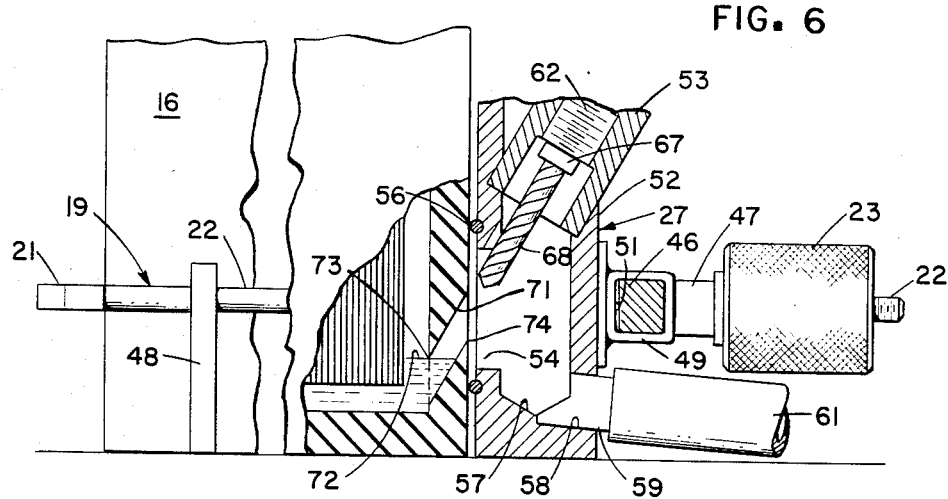
FIG. 6 is a cross-sectional view similar to FIG. 5 showing the drill in a withdrawn position and the electrolyte substantially drained from the battery.

The apparatus of the present invention is generally disclosed in FIG. 2 and includes an apparatus that may be rapidly attached to a pair of batteries, whereafter, drilling facilities are operated to drill angular holes in the lower corners of two adjacent batteries. Immediately thereafter, a vacuum system is rendered effective to drain the electrolyte with a minimum degree of spillage. In FIG. 2, there is shown an array or bank of spaced batteries 16 and two of the new battery and draining apparatuses designated 17 and 18. Each apparatus, such as apparatus 18, includes a T-bar gripper 19 having a cross-arm 21 which is initially positioned in a vertical position for movement between a pair of adjacent batteries. The T-bar gripper 19 includes a rod-like stem having a threaded end to receive a knurled internally threaded collar or knob 23. After the gripper cross-arm 21 is positioned behind the adjacent pair of batteries, an initial turning of the knurled collar causes the cross-arm 21 to move into a horizontal position, whereafter, the entire apparatus 18 is pulled forward to abut the cross-bar against the back walls 24 and 26 of the adjacent batteries. Further turning of the knurled collar 23 causes the cross-arm 21 to tightly engage the rear walls of the batteries while a pair of vacuum chambers 27 and 28 are moved into tight engagement with a pair of front walls 29 and 31 of the battery. Suitable seals are mounted on the vacuum chambers to seal the chambers from the ambient atmosphere.

With the first apparatus 18 in place, the second apparatus 17 is positioned and locked on a second pair of batteries. Each vacuum chamber mounts an acute angular drill that is operated to bore an acute angular hole in the lower corner section of each engaged front battery wall. Following the tapping of the angular holes in the battery casing, vacuum is applied from a pump 32 through a common line 33, through branch lines 34 and 36 and through subbranch lines containing valves 37, 38, 39, and 40 to the respective vacuum chambers of the two tap and drain apparatuses 17 and 18. The applied vacuum acts to draw the electrolyte from the batteries through the various lines through the vacuum pump to a discharge line 41 running through a valve 42 to a tank 43 or carboy or other suitable receptacle.

Referring now to FIGS. 3, 4, 5, and 6 for a detailed description of tap and drain apparatus 18, it will be noted that the rod stem 22 of the T-bar 19 passes through a tapered hole 45 formed elongated support bar 46 of square-cross section and a collar 47 secured to the bar. As mentioned, screw threads are formed on the end of the rod stem 22 to receive the internally bored and threaded knurled knob 23. Also, pivotally mounted on the rod 22 is a support leg 48 (see FIGS. 3 and 6) which is fittable in the space between the pair of adjacent batteries 16 and serves to support the T-bar gripper 19 in a horizontal position.

The vacuum chambers 27 and 28 have laterally projecting coupling sliders 49 and 51 loosely riding on the support bar 46 which permit the chambers to be moved into position, whereafter, the chambers may be drawn and sealed against lower corner sections of adjacent batteries. The tapered hole 45 and loose fitting at the sliders 49 and 51 on the support bar 46 permit a degree of pivoting of the support bar, and hence the chambers may be drawn up and sealed against a pair of batteries in which the front walls are not laterally aligned. Internal dimples 51 are formed on the sliders 49 and 50 to act as fulcrums for the rod 46 when pivoted to move the housings 27 and 28 into sliding engagement with a pair of non-laterally aligned batteries.

Considering vacuum chamber 27 which is identical to vacuum chamber 28, the chamber is constructed of a first rectangularly shaped housing 52 through which angularly projects a second cylindrical housing 53. Housing 52 (see FIGS. 5 and 6) is formed with a side wall opening 54 surrounded by an O-ring seal 56. When the housing 52 is positioned on the floor at the battery installation site, the gripper rod 22 is supported by the leg 48 and the sliders 49 and 51 in a horizontal position. The cavity within the housing 52 is shaped to provide a conical sump 57 communicating with a second hole 58 into which is mounted a short coupling sleeve 59 on which is assembled the end of a subbranch vacuum line 61 (see also FIG. 2) that includes the valve 39.

The cylindrical second housing 53 (see FIG. 5) contains a pair of sealed bushings 62 and 63 through which extend an unfluted section 64 of a drill bit 66. A stop collar 67 is secured to the bit at the junction with a fluted end 68 of the bit. When the bit 66 is in a withdrawn position, the collar 67 abuts the bushing 62, thus limiting withdrawal of the bit. It will be noted that the bit 66 is mounted at an acute angle greater than 45° so that when the bit is operated a hole 71 is bored in the wall of the battery casing at an angle greater than 45°. The stop collar is set so that the drill bores a hole through the side wall of the battery casing without drilling into the bottom of the casing.

In use of this embodiment of the invention, the T-bar gripper 19 with the cross-bar 21 in a vertical plane is inserted between a pair of adjacent batteries 16. The apparatus 18 is placed so that the bottoms of the vacuum chambers 27 and 28 and the leg 48 rest on the floor. The rod 22 is turned to move cross-bar 21 into a horizontal orientation to extend behind the rear walls of the battery. The knurled nob 23 is pulled forward to abut the cross-bar against the rear walls of the adjacent batteries. Upon turning of the knurled knob, the vacuum chambers 27 and are drawn toward the front walls of the battery, thus compressing the O-rings to seal the vacuum chambers against the front walls of the adjacent batteries. A chuck (not shown) of a commercial drill is coupled to the shank 64 of the bit 66. Operation of the drill effectuates the boring of an acute angular hole in the front wall of the battery. The drill bit 66 is withdrawn, permitting the electrolyte to flow from the battery into the sealed housing 52.

Next, the valve 39 is opened to apply vacuum from the pump 32, whereafter, the electrolyte is substantially completely withdrawn from the battery. The vacuum is effective to completely withdraw all of the electrolyte from the sump 57 of the housing 52. The level of the electrolyte remaining in the battery drops to a level 72 which approximates the level of the top 73 of the hole 71 on the inside of the battery casing. This electrolyte level is below the level of the bottom 74 of the hole 71 on the outside of the battery casing. Following the draining of the electrolyte, the knurled nob 23 is turned to release the gripper 19, and the tap and drain apparatus 18 is removed from the drainage site. The drained battery may now be removed from the battery bank and replaced with a fresh battery. During the removal of the battery, there will be a slight amount of tilting, but the small amount of electrolyte left in the battery will be inhibited from spilling due to the fact that the level of the remaining electrolyte is below the level of the bottom of the drain hole on the outside of the battery casing. The hole may also be plugged with a stopper to further insure against spillage.

Attention is now directed to FIGS. 7, 8, 9, and 10 for consideration of a modified embodiment of the invention which features another means for gripping a pair of adjacent batteries 16-1 and 16-2 and securing a pair of vacuum chambers 102 and 103 to the batteries. These vacuum chambers 102 and 103 incorporate vacuum draining and drilling facilities that are substantially the same as those described with respect to the embodiment of the invention shown in FIGS. 3–6. The battery gripping means are in the form of a scissor-like arrangement (see FIG. 7) that includes a first channel-shaped gripping lever 104 having projecting cleats 106 and a second movable channel-shaped lever 107 nested within the channel-shaped lever 104. With the first and second lever 104 and 107 in overlaying relation, the levers may be positioned in the space between the pair of adjacent batteries. Subsequent pivoting of the movable lever 107 causes the lever to engage and react against a right side wall 108 of the battery 16-1 to push the lever 104 toward the left wall 109 of the battery 16-2, thus forcing the cleats 106 into biting engagement with the wall 109.

Figure 7:
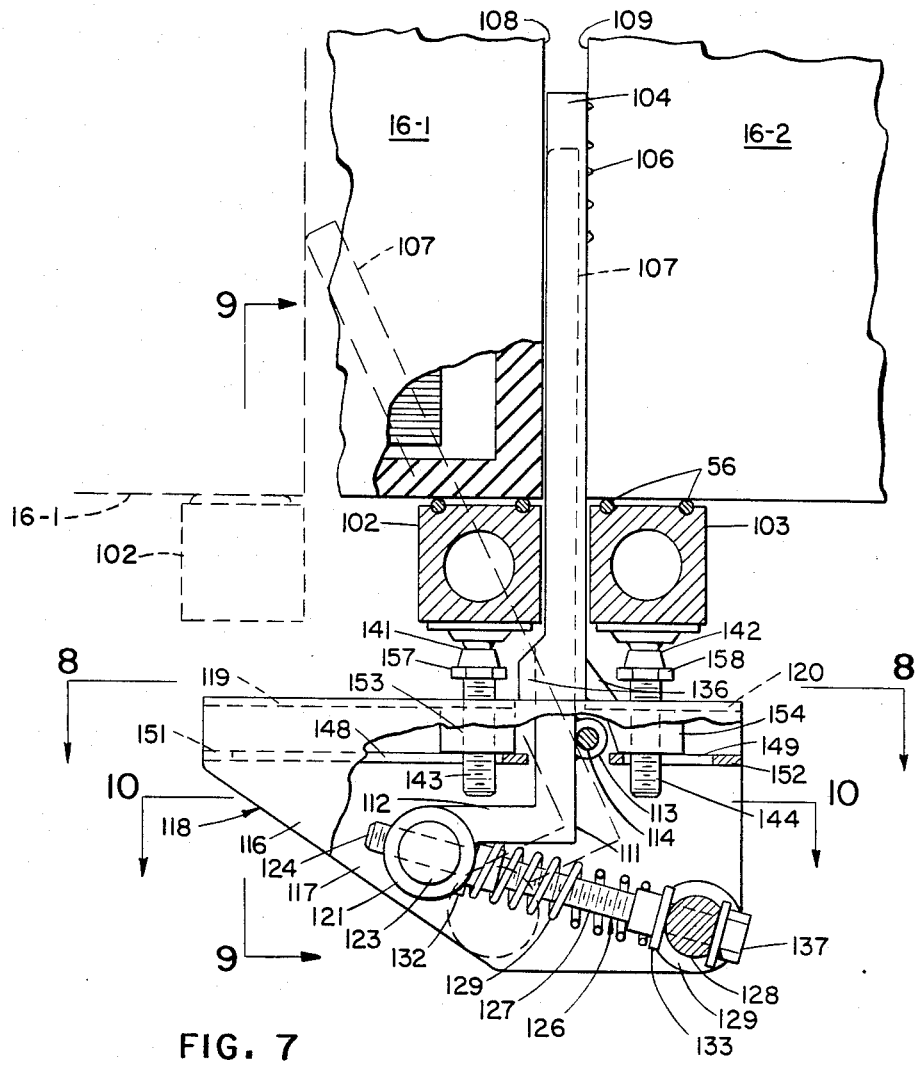
FIG. 7 is a top view partially in section of a battery tap and drain apparatus and a scissor-like clamping arrangement for securing the apparatus to a pair of batteries which illustrate a modified embodiment of the invention.

As shown in FIG. 7, the lever 107 is L-shaped and includes an upright channel section 111 running into a right angular bifurcated leg 112. Attached to a lower section of the channel section 111 is an embossment 113 that is bored transversely to receive a pivot pin 114. Pivot pin 114 is seated in opposed side plates 116 and 117 of U-shaped housing or mounting frame 118. The side plates 116 and 117 are interconnected by a pair of bridging mounting plates 119 and 120. The adjacent ends of the bridging plates are spaced apart to provide a gap, to accommodate the movement of the pivoted lever 107. The bifurcated leg section 112 is welded to a pair of hubs 121 and 122 (see FIG. 10) which may be interconnected by a slotted cross piece (not shown). The hubs provide a rotatable mounting for a link pin 123 having a diametrically extending threaded bore into which extends a threaded section 124 of a bolt generally designated by the reference numeral 126. An unthreaded shank section 127 of the bolt projects through an unthreaded bore formed in a link pin 128 having opposed ends rotatably mounted in a pair of bushings 129 and 130 fitted in and secured to the side plates 116 and 117 of the U-shaped housing.

A compression spring 131 positioned about the bolt 126 urged a pair of flanged sleeves 132 and 133 into engagement with the link pins 123 and 128 and thus functions to urge the pin 123 to pivot the L-shaped lever 107 about the pivot pin 114 into a closed or nested position with respect to the cleated channel lever 104. The channel lever 104 is secured to braces 136 welded to the side plates 116 and 117 of the U-shaped housing 118. Pivoting of the lever 107 is accomplished by turning a head 137 of the bolt 126. A socket wrench (not shown) is used to turn the bolt head 137 so that the bolt draws the link pin 123 toward the right to impart a counterclockwise pivotal movement of the lever 107 about the pivot pin 114. As previously mentioned, the pivoting of the lever 107 into engagement with the battery wall 108 causes the lever 104 to reactively move and bite the cleats 106 into the wall of the battery 16-2.

The vacuum chambers 102 and 103 (see FIGS. 7 and 9) are mounted on a pair of ball and socket swivels 141 and 142 that are secured to a pair of threaded rods 143 and 144 which extend through elongated slots 146 and 147 (see FIG. 8) formed in the bridging plates 119 and 120 of the U-shaped housing. These rods extend through a pair of aligned slots 148 and 149 formed in a pair of aligned retainer bars 151 and 152 welded between side plates 116 and 117. A pair of captive nuts 153 and 154 of rectangular shape receive the threaded shanks of the rods 143 and 144. The nuts 153 and 154 are confined in, but are free to slide along, a channel defined by the bridging plates 119 and 120, the retainer bars 151 and 152, and the side plates 116 and 117. Inasmuch as the nuts are confined in the channel, the rectangular nuts are held from rotation upon turning of the threaded shanks of the rods 143 and 144. Head portions 157 and 158 of the respective swivels 141 and 142 are hexangular in shape and function as bolt heads which are adapted to be turned by the use of a spanner wrench. When the threaded rods 143 and 144 are turned, the captive nuts 153 and 154 react against the rod threads to move the threaded rods to advance the vacuum chambers toward and away from the associated batteries 16-1 and 16-2.

In use of this embodiment of the invention, the scissor-like gripper is operated by turning the bolt 126 to move the levers 104 and 107 into the nested relation, whereafter, the levers are passed between the pair of spaced batteries 16-1 and 16-2. The attending user positions the vacuum chambers 102 and 103 in engagement with the adjacent lower corners of the batteries. The bolt head 137 is now turned to pivot the lever 107 about the pivot pin 114 so that this lever pushes against the right wall 108 of the battery 16-1, and reactive forces are effective to move the lever 104 toward the battery 16-2, and hence, force the cleats 106 into biting engagement with the wall 109 of the battery 16-2. The hexangular sections 157 and 158 of the swivels are now wrench-turned to force the vacuum chambers 102 and 103 into engagement with the batteries. Chambers 102 and 103 are substantially the same in construction with chambers 52 described with respect to the first embodiment of the invention, thus O-rings 56 are compressed to seal the chambers against the batteries. Drills 64 in the respective chambers 102 and 103 are operated to bore acute angular holes 71. The drills 64 are withdrawn and vacuum is applied on lines, e.g., 61, to draw the electrolyte from the batteries.

In this embodiment, a semi-circular screen 161 is mounted within a suitable recess formed in the walls of the vacuum chamber. The screen acts to retain any large size chips resulting from the drilling operation which might damage the particular type of vacuum pump which is utilized.

Figure 8:
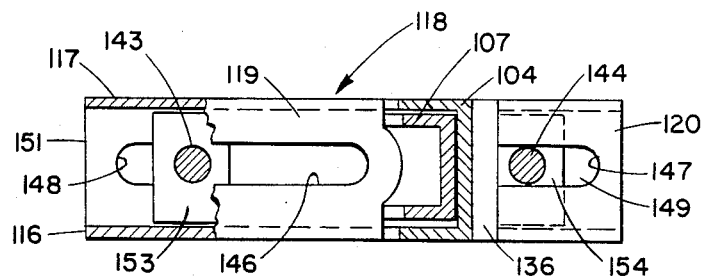
FIG. 8 is a view taken along line 8—8 of FIG. 7 showing the construction of a housing for supporting the tap and drain apparatus and the clamping arrangement.
Figure 9:
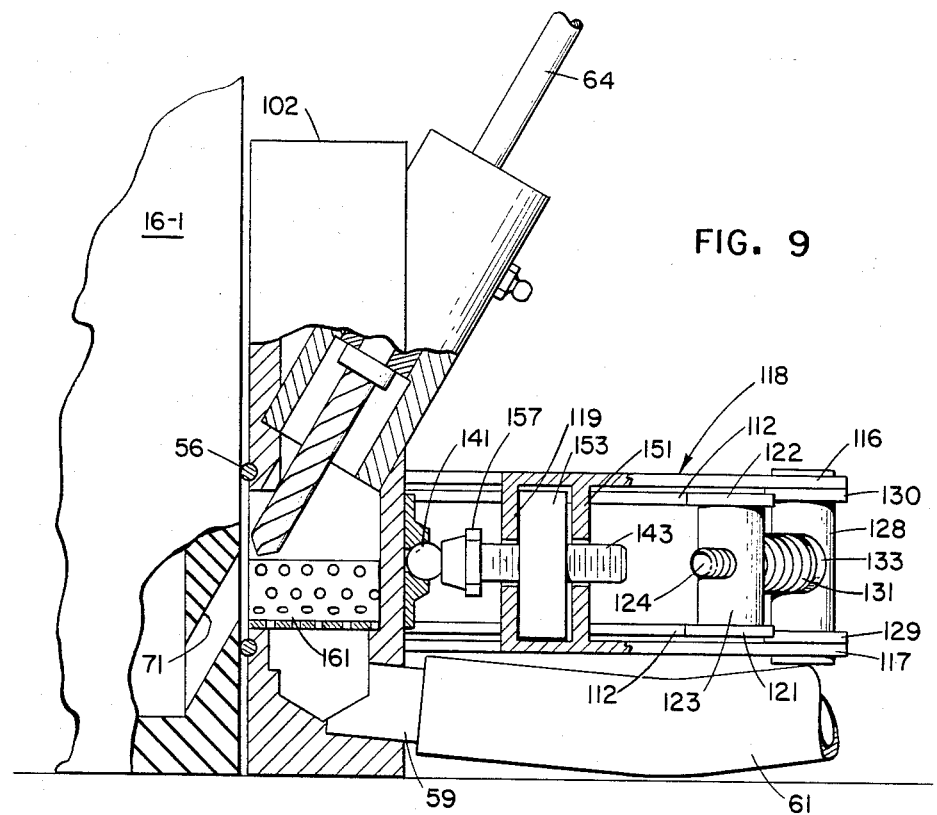
FIG. 9 is a side elevational view partially cut away to show the details of the battery casing drill and a vacuum drain chamber.
Figure 10:
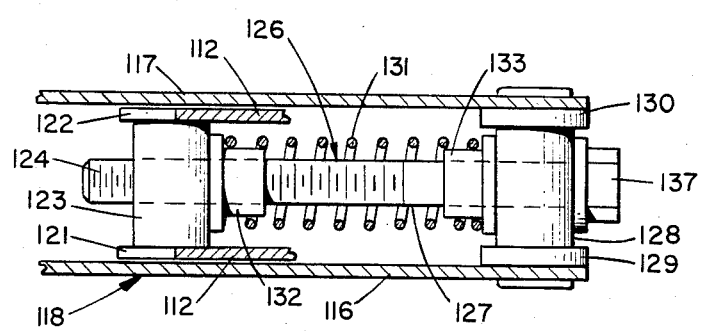
FIG. 10 is a sectional view taken along line 10—10 of FIG. 7 showing the details of the mechanism for manipulating the battery gripping device.

In the situation where the batteries 16-1 and 16-2 are spaced apart a greater distance, as illustrated by the dashed portion of the battery 16-1 in FIG. 7, the vacuum chamber 102 is moved to the left into the illustrated dashed-line position. This movement of the chamber 102 is permitted because the threaded member 143 passes through the slots 146 and 148 formed in the bridging member 119 and the bar 151. The position assumed by the threaded rod 143 is shown in FIG. 8. Again, the head 137 of the bolt 126 is wrench-turned to pivot the lever 107 into engagement with the right-hand wall of the battery 16-1 so that reactive forces act to move the lever 104 toward the right and thereby bite the cleats 106 into the left-hand wall 109 of the battery 16-2. The nut heads 157 and 158 of the swivels are wrench-turned to move the chambers 102 and 103 into sealed engagement with the lower adjacent wall corners in anticipation of the subsequent drilling and draining operations.

What is claimed is:

1. An apparatus for tapping and draining electrolyte from a pair of adjacent batteries, which comprises:
    a pair of chambers each having an opening surrounded by a compressible seal;
    a gripping device mounted on said chambers having means positionable between a pair of batteries for gripping two walls of the pair of batteries;
    means for moving said chambers relative to said gripping device to move said chambers towards the pair of batteries to press said compressible seals against the batteries;
    means mounted on and extendable through said chambers and said openings therein for drilling holes in the batteries; and
    means for applying vacuum to the interiors of said chambers.

2. An apparatus as defined in claim 1 which includes: means for supporting said chambers for movement toward and away from each other.

3. An apparatus as defined in claim 2 where the supporting means is a bar, and includes a pair of sliders extending from said chambers and riding on said bar.

4. An apparatus as defined in claim 1 wherein the drilling means are mounted to extend through said chambers at acute angles greater than 45° with respect to the horizontal.

5. An apparatus as defined in claim 1 wherein the gripping device includes:
    a bar fittable between a pair of adjacent batteries;
    a cross member secured to one end of the bar for movement from an upright position fittable between the pair of batteries to a horizontal position in back of the rear walls of the pair of adjacent batteries; and
    means for operating said gripping device to move said rod between the batteries and said cross member into engagement with the rear walls of the pair of batteries while moving said housing towards the front walls of the batteries to compress the seals against the front walls of the batteries.

6. An apparatus as defined in claim 1 wherein the gripping device includes:
    a pair of movably mounted scissor-like levers fittable between the pair of adjacent batteries; and
    means for moving the levers relative to each other to engage a pair of side walls of the pair of adjacent batteries.

7. An apparatus as defined in claim 6 wherein at least one of said levers has mounted thereon a series of cleats to firmly bite into and grip at least one of the battery walls.

8. An apparatus as defined in claim 2 wherein said supporting means is a housing; and said gripping means include:
    a pair of levers, one of which is fixed to said housing and the other of which is pivotally on said housing;
    means for urging said pivotally mounted lever into overlaying relation with said fixed lever; and
    means for pivoting said other lever against said urging means to move said other lever against a side wall of a battery to reactively engage said fixed lever against a side wall of the adjacent battery.

9. An apparatus for tapping and draining electrolyte from a pair of batteries, which comprises:
    a first support bar having a hole therethrough;
    a rod slidably mounted in said hole and positionable between the pair of batteries;
    a second bar mounted on a first end of said rod, said bar being movable into a vertical position for movement between the adjacent walls of the pair of batteries and being movable into a horizontal position to abut the back walls of the pair of batteries;
    a pair of chambers slideably mounted on said first bar, each of said chambers having an opening surrounded by a compressible seal;
    means for moving the rod through the hole in the bar to draw the second bar into engagement with the rear walls of the adjacent batteries while said pair of chambers are moved against the front walls of the pair of batteries to compress said compressible seals against the front walls of the batteries;
    each of said chambers having a drill mounted theron to extend into said chambers at acute angles greater than 45°;
    means for sliding and rotating the drills to bore holes in the front walls of the pair of batteries wherein the bottoms of the bores on the outside of the batteries are above the tops of the bores on the inside of the batteries; and
    means for applying vacuum to either or both of said housings to withdrawn electrolyte from either one or both of the batteries.

* * * * *